(12) United States Patent
Williams et al.

(10) Patent No.: US 6,565,475 B2
(45) Date of Patent: May 20, 2003

(54) FULL-TIME TRANSFER CASE WITH INTEGRATED PLANETARY GEARSET

(75) Inventors: Randolph C. Williams, Weedsport, NY (US); Aaron Ronk, Lake George, NY (US); Stanislav Ponca, Liverpool, NY (US); Timothy R. Stalloch, Cicero, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/000,736

(22) Filed: Oct. 19, 2001

(65) Prior Publication Data

US 2003/0078130 A1 Apr. 24, 2003

(51) Int. Cl.[7] .................... B60K 17/344; F16H 37/08
(52) U.S. Cl. .................... 475/204; 475/298; 180/249
(58) Field of Search ................. 475/298, 319, 475/320, 204; 180/249

(56) References Cited

U.S. PATENT DOCUMENTS

| | | | |
|---|---|---|---|
| 4,063,470 A | * 12/1977 | Kelbel | 475/320 |
| 4,347,762 A | * 9/1982 | Holdeman | 475/298 |
| 4,770,280 A | 9/1988 | Frost | |
| 5,323,871 A | 6/1994 | Wilson et al. | |
| 5,411,447 A | 5/1995 | Frost | |
| 5,643,129 A | * 7/1997 | Richardson | 475/204 |
| 5,651,749 A | 7/1997 | Wilson et al. | |
| 5,697,861 A | 12/1997 | Wilson | |
| 5,700,222 A | 12/1997 | Bowen | |
| 5,702,321 A | 12/1997 | Bakowski et al. | |
| 5,704,867 A | 1/1998 | Bowen | |
| 5,836,847 A | 11/1998 | Pritchard | |
| 5,902,205 A | 5/1999 | Williams | |
| 5,947,858 A | 9/1999 | Williams | |
| 6,022,289 A | 2/2000 | Francis | |
| 6,056,666 A | 5/2000 | Williams | |
| 6,152,848 A | 11/2000 | Williams et al. | |
| 6,283,887 B1 | 9/2001 | Brown et al. | |

* cited by examiner

Primary Examiner—Rodney H. Bonck
Assistant Examiner—Dennis Abdelnour
(74) Attorney, Agent, or Firm—Harness, Dickey & Pierce, P.L.C.

(57) ABSTRACT

A full-time two-speed transfer case is equipped with an integrated planetary gearset assembly and a range shift mechanism to provide high-range and low-range drive connections. The integrated planetary gearset assembly includes a first gearset which acts as a two-speed reduction unit and a second gearset which acts as an interaxle differential. The synchronized range shift mechanism is arranged to concurrently move two components of the first gearset and can be synchronized to permit on-the-move range shifts.

20 Claims, 5 Drawing Sheets

FULL-TIME TRANSFER CASE WITH INTEGRATED PLANETARY GEARSET

FIELD OF THE INVENTION

The present invention relates generally to a power transfer system for controlling the distribution of drive torque between the front and rear drivelines of a four-wheel drive vehicle. More particularly, the present relates to a full-time transfer case having a two-speed gear reduction unit and an interaxle differential integrated into a planetary gear assembly, a range shift mechanism for establishing high-range and low-range drive modes, and a biasing clutch for controlling interaxle slip between the front and rear drivelines.

BACKGROUND OF THE INVENTION

Due to growing consumer demand for four-wheel drive vehicles, a plethora of different power transfer systems are currently utilized for directing power (i.e., drive torque) to all four wheels of the vehicle. For example, in many "part-time" power transfer systems, a transfer case is installed between the front and rear drivelines and is normally operable in a two-wheel drive mode for delivering drive torque to the driven wheels. However, when the four-wheel drive mode is desired, a mode shift mechanism is selectively actuated by the vehicle operator for directly coupling the non-driven wheels to the driven wheels for establishing a part-time or locked four-wheel drive mode. One example of a part-time transfer case is disclosed in commonly-owned U.S. Pat. No. 4,770,280.

It is also known to use "on-demand" power transfer systems for automatically directing power to the non-driven wheels, without any input or action on the part of the vehicle operator, when traction is lost at the driven wheels. Typically, the on-demand feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque to the non-driven wheels. The amount of drive torque transferred through the clutch assembly can be varied as a function of specific vehicle dynamics detected by the sensor arrangement. One example of an on-demand power transfer system is disclosed in commonly-owned U.S. Pat. No. 5,323,871.

As yet a further alternative, some vehicles are equipped with a full-time power transfer system having a transfer case equipped with a center differential that functions to permit interaxle speed differentiation while transferring drive torque to both the front and rear drivelines. To minimize loss of traction due to wheel slip, many full-time transfer cases are also equipped with a clutch assembly for limiting speed differentiation and biasing the torque transferred across the center differential. For example, full-time transfer cases are disclosed in commonly-owned U.S. Pat. Nos. 5,697,861 and 5,702,321.

In an effort to minimize the overall size of full-time two-speed transfer cases, it has been proposed to incorporate the gear reduction unit and the interaxle differential into a common planetary gear assembly. For example, commonly-owned U.S. Pat. No. 5,902,205 discloses a full-time two-speed transfer case equipped with an integrated planetary gearset which is operable for establishing full-time high-range and low-range four-wheel drive modes through on-the-move shifting of a synchronized range shift mechanism. While such an arrangement provides a compact construction, there is a continuing need to develop alternatives which meet modern requirements for low noise and weight while advancing the state of the four-wheel drive art.

SUMMARY OF THE INVENTION

It is therefore an object of the present invention to provide a transfer case for a full-time four-wheel drive vehicle having a planetary gear assembly which integrates a gear reduction unit and an interaxle differential into a common arrangement.

As an additional object of the present invention, the full-time two-speed transfer case includes a range shift mechanism which can be selectively actuated for establishing a full-time four-wheel high-range drive mode, a neutral mode, and a full-time four-wheel low-range drive mode.

According to another object of the present invention, the transfer case includes a biasing clutch which is operably associated with the outputs of the planetary gear assembly for limiting speed differentiation and regulating the drive torque distribution therebetween in response to the occurrence of slip between the front and rear output shafts of the transfer case. To this end, a control system is provided which includes sensors for detecting and generating sensor signals indicative of various dynamic and operational characteristics of the vehicle, and a controller for controlling actuation of the biasing clutch in response to the sensor signals. Upon the occurrence of traction loss, the clutch is automatically actuated for limiting interaxle slip while transferring increased drive torque to the non-slipping driveline.

According a preferred embodiment of the present invention, the planetary gear assembly is operably installed between and input shaft and front and rear output shafts of the transfer case and is constructed in a compact arrangement. The planetary gear assembly includes a first planetary gearset and a second planetary gearset which are interconnected by a common carrier assembly. The first planetary gearset is operably installed between the input shaft and the second planetary gearset for driving the carrier assembly at either of a direct speed ratio (i.e., high-range) or a reduced speed ratio (i.e., low-range) relative to the input shaft. The common carrier assembly acts as the input to the second planetary gearset which has first and second outputs respectively connected to the rear and front output shafts of the transfer case. Thus, the second planetary gearset functions as an interaxle differential for permitting speed differentiation and distributing drive torque between the front and rear output shafts of the transfer case.

Additional objects come with features and advantages of the present invention will become apparent from studying the following detailed description and appended claims when taken in conjunction with accompanying drawings.

DETAILED DESCRIPTION OF THE PREFERRED EMBODIMENTS

Figure 1:
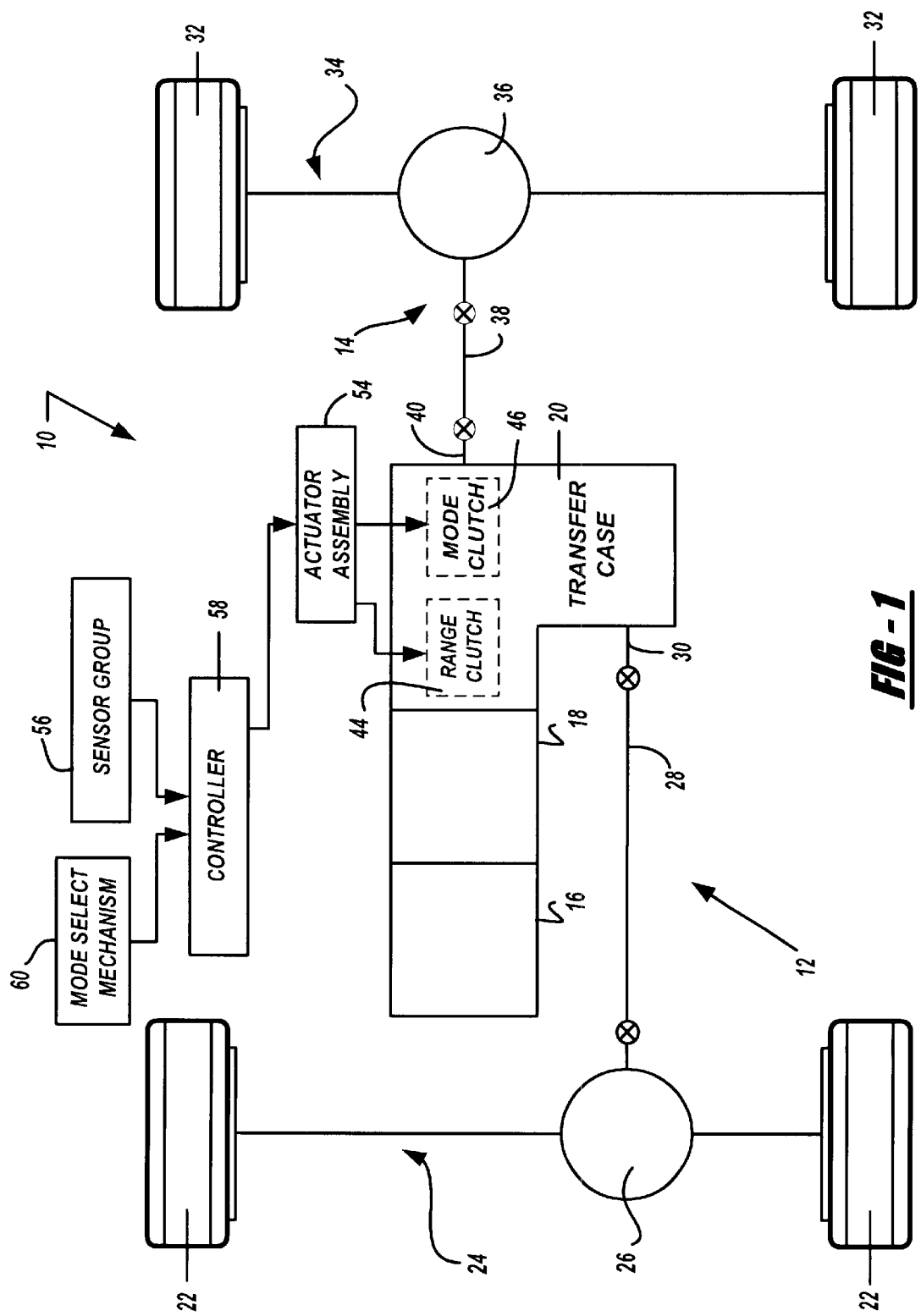
FIG. 1 is a schematic representation of a four-wheel drive motor vehicle equipped with a full-time power transfer system according to the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both driveable from a source of power, such as an engine 16, through a transmission 18 which may be of the manual or automatic type. In the particular embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be detailed hereinafter with greater specificity, transfer case 20 is equipped with a planetary gear assembly 42, a range clutch 44, and a mode clutch assembly 46. Planetary gear assembly 42 includes a first planetary gearset 48 and a second planetary gearset 50 interconnected through a common carrier assembly 52. Range clutch 44 is operable to couple components of first planetary gearset 48 for driving carrier assembly 52 at either of a first (high-range) speed ratios or a second (low-range) speed ratio. Second planetary gearset 50 of planetary gear assembly 42 functions as an interaxle differential having carrier assembly 52 as its input with other components thereof operably coupled to front output shaft 30 and rear output shaft 40 of transfer case 20. Additionally, mode clutch assembly 48 is operable to control the magnitude of speed differentiation and torque biasing between rear output shaft 40 and front output shaft 30. Power transfer system 10 further includes a power-operated actuator assembly 54 for controlling actuation of range shift mechanism 44 and mode clutch assembly 46, a sensor group 56 for sensing dynamic and operational characteristics of the motor vehicle and generating sensor input signals indicative thereof, and a controller 58 for generating control signals in response to the sensor input signals. Power transfer system 10 also includes a mode select mechanism 60 for permitting the vehicle operator to select one of the available drive modes. In particular, controller 58 functions to control actuation of power-operated actuator assembly 54 in response to the mode signal sent to controller 58 from mode select mechanism 60 that is indicative to the particular mode selected.

Figure 2:
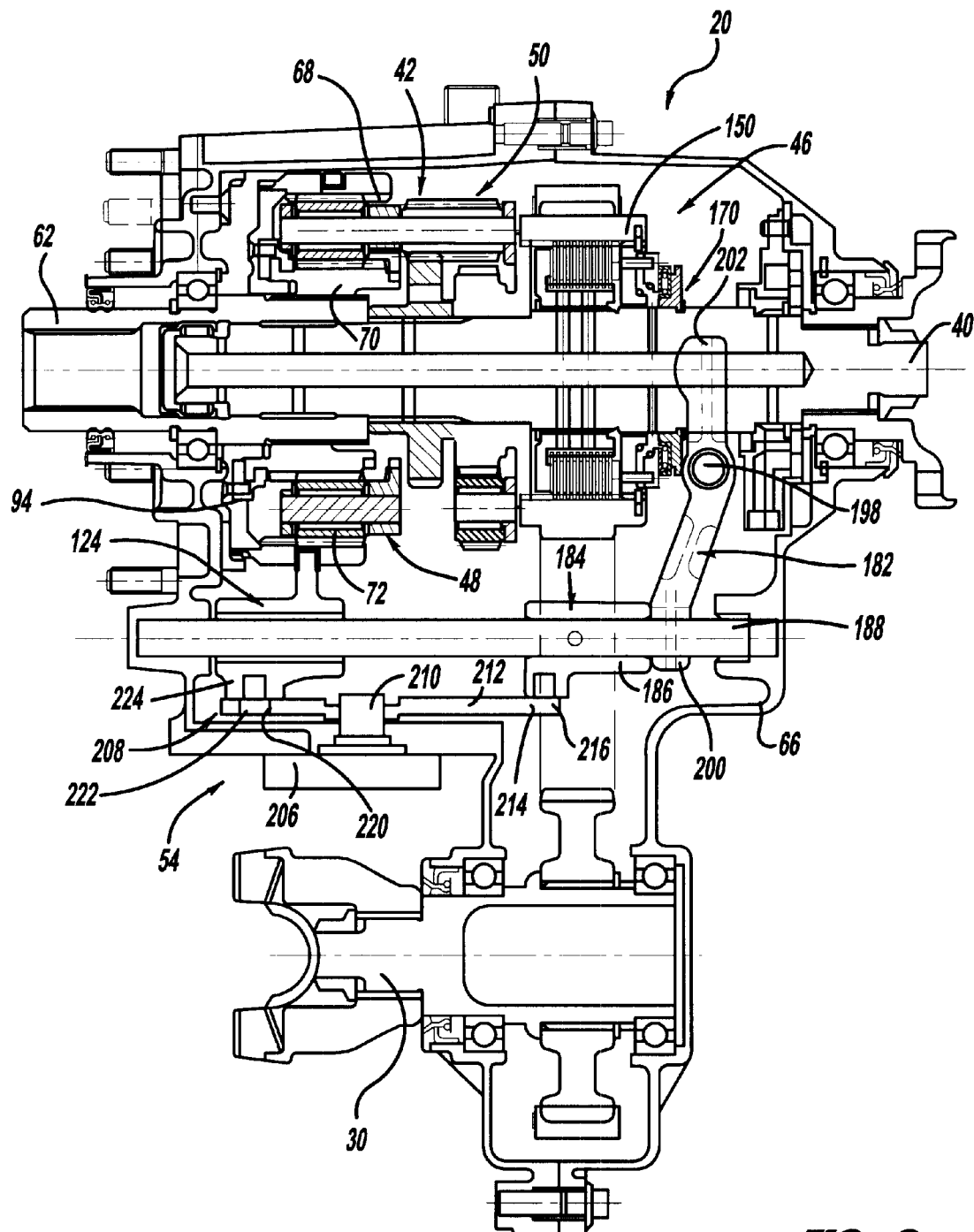
FIG. 2 is a sectional view of a full-time two-speed transfer case constructed according to a preferred embodiment of the present invention.
Figure 3:
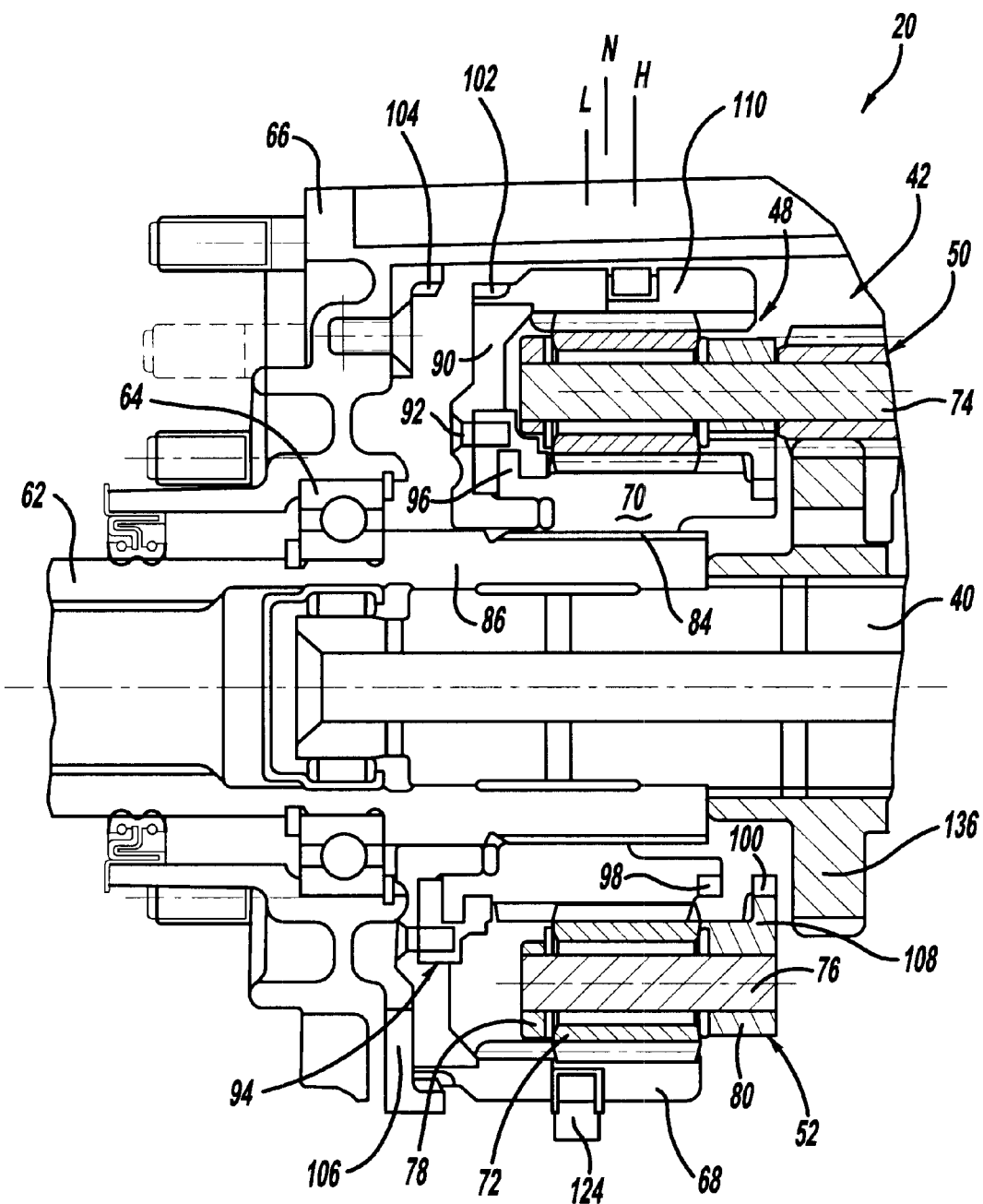
FIG. 3 is an enlarged partial view taken from FIG. 2 showing components of the integrated planetary gear assembly and the range shift mechanism in greater detail.
Figure 4:
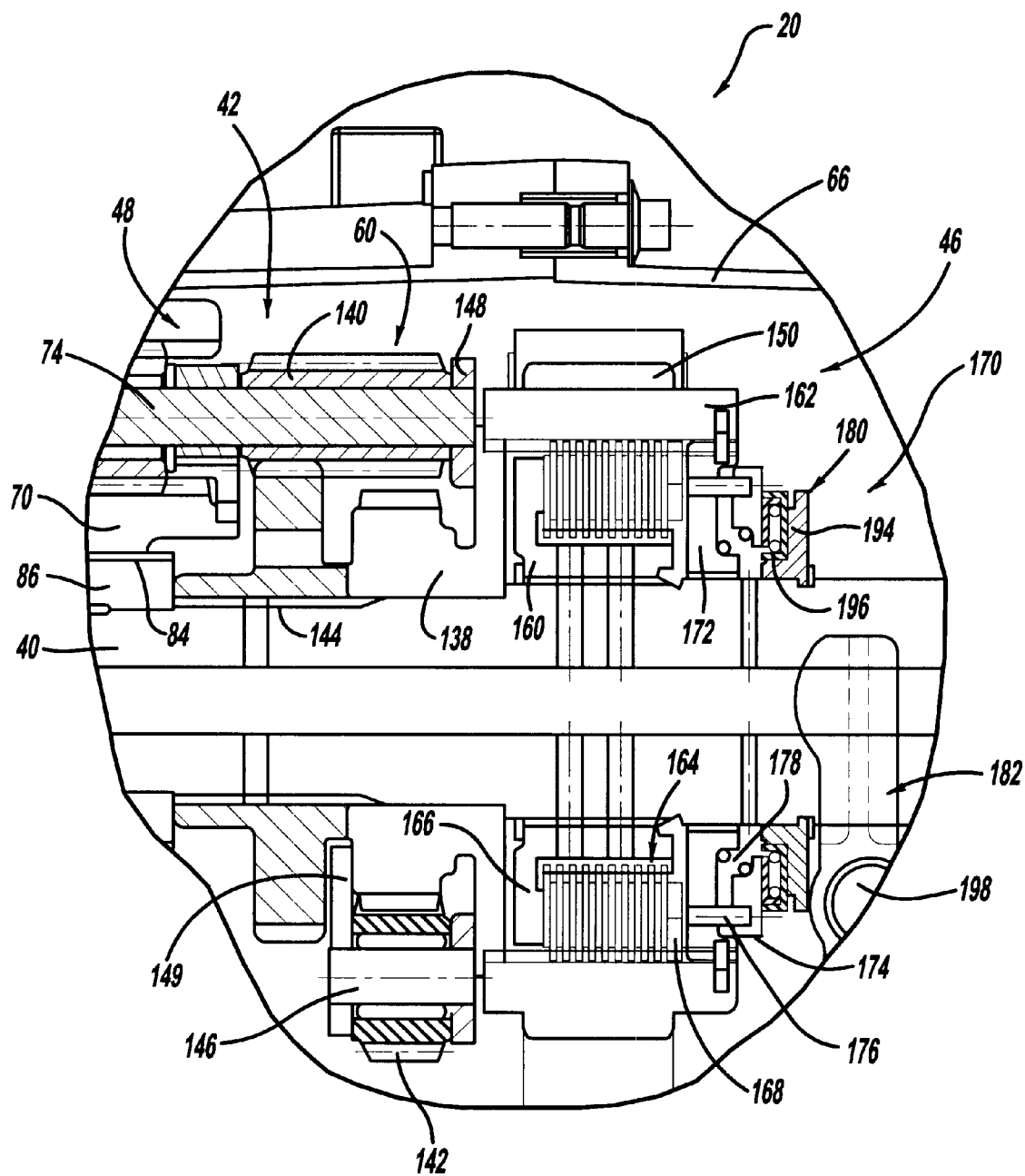
FIG. 4 is an enlarged partial view taken from FIG. 2 showing the components of the mode clutch assembly in greater detail.

With particular reference now to FIG. 2 through 4 of the drawings, transfer case 20 is shown to include an input shaft 62 rotatably supported by a bearing assembly 64 from a housing 66. Input shaft 62 is adapted for connection to an output shaft of transmission 18. Likewise, front output shaft 30 and rear output shaft 40 are also rotatably supported by housing 66. As noted, planetary gear assembly 42 includes a first gearset 48 interconnected to second gearset 50 via a common carrier assembly 52. First gearset 48 includes a ring gear 68, a first sun gear 70, and a set of first planet gears 72 each meshed with ring gear 68 and first sun gear 70. Planet gears 72 are rotatably supported on long pins 74 and short pins 76, each of which extends between first and second carrier rings 78 and 80, respectively, of carrier assembly 52. First sun gear 70 is shown fixed via a splined connection 84 for rotation with and axial sliding movement on a quill shaft segment 86 of input shaft 62.

Ring gear 68 is shown to include a radial plate segment 90 that is fixed via bolts 92 to a coupling ring 94. Coupling ring 94 includes a circumferential groove within which a radial lug segment 96 of first sun gear 70 is retained. Coupling ring 94 permits first sun gear 70 to rotate freely relative to ring gear 68 while also enabling concurrent axial movement of ring gear 68 and sun gear 70 relative to carrier assembly 52 between a first position (denoted by position line "H") and a second position (denoted by position line "L"), and a control or third position (denoted by position line "N"). When ring gear 68 and first sun gear 70 are located in the H position, as shown in the upper-half of FIG. 3, external clutch teeth 98 on first sun gear 70 are engaged with internal clutch teeth 100 on a clutch plate segment 108 of second carrier ring 80. As such, first sun gear 70 couples carrier assembly 52 for common rotation with input shaft 62. In contrast, sun gear clutch teeth 98 are released from engagement with clutch teeth 100 on second carrier ring 80 when ring gear 68 and first sun gear 70 are located in the L position, as shown in the lower-half of FIG. 3, thereby allowing carrier assembly 52 to rotate relative to input shaft 62.

Range shift mechanism 44 is shown to include a range sleeve 110 that is fixed to or formed integrally with ring gear 68. Thus, range sleeve 110 is also moveable between the high-range ("H") position, the low-range ("L") position, and the neutral ("N") position. In addition, a first range fork 124 is provided which moves under the control of actuator assembly 54 to control axial movement of range sleeve 110 between its three range positions. First range fork 124 has a fork segment retained in a groove formed in range sleeve 110. As will be detailed, actuator assembly 54 includes a drive mechanism which functions to move range fork 124 so as to cause axial movement of range sleeve 110 for establishing the different drive connections between input shaft 62 and carrier assembly 52.

A first or high-range drive connection is established between input shaft 62 and carrier assembly 52 when range sleeve 110 is in its H position. With range sleeve 110 in its H position, ring gear 68 and first sun gear 70 are located such that external clutch teeth 98 on first sun gear 70 engage internal clutch teeth 100 on second carrier ring 80. Thus, ring gear 68, first sun gear 70 and carrier assembly 52 are all commonly driven by input shaft 62. This establishes a direct speed ratio drive connection between input shaft 62 and carrier assembly 52 such that first planet gears 72 are unloaded during operation of transfer case 20 in the high-range modes. This is a significant advantage over conventional two-speed planetary units since it eliminates concerns about fretting corrosion of the teeth on first planet gears 72 and permits use of quieter and smaller helical gears instead of conventional spur gears.

A second or low-range drive connection is established between input shaft 62 and carrier assembly 52 when range sleeve 110 is in its L position. With range sleeve 110 in its L position, its clutch teeth 102 are engaged with clutch teeth 104 formed on a clutch plate 106 that is fixed to housing 66 such that ring gear 68 is braked against rotation. In addition, this movement causes first sun gear 70 to slide axially to a position whereat its clutch teeth 98 are disengaged from clutch teeth 100 on second carrier ring 80. As such, driven rotation of input shaft 62 drives first sun gear 70 via quill shaft 86 such that carrier assembly 52 is rotatively driven at a reduced speed due to ring gear 68 being braked. Finally, a neutral (non-driven) mode is established when range sleeve 110 is in its N position. With range sleeve 110 in its N position, first sun gear 70 is released from carrier assembly 52 and ring gear 68 is released from housing 66 such that no drive torque is delivered from input shaft 62 to carrier assembly 52.

With continued reference to FIG. 2 through 4, second gearset 50 is shown as a dual-planetary arrangement which functions as an interaxle differential to permit speed differentiation and distribute drive torque between front output shaft 30 and rear output shaft 40. Carrier assembly 52, when driven at either of the high-range and low-range speed ratios, acts as the input to second gearset 50 which has its outputs coupled to output shafts 30 and 40. In particular, second gearset 50 includes a second sun gear 136, a third sun gear 138, a set of full-length second planet gears 140, and a set of half-length third planet gears 142. Second sun gear 136 is shown to be fixed via a splined connection 144 to rear output shaft 40 while third sun gear 138 is journally supported thereon. Second planet gears 140 are rotatably supported on long pins 74 while third planet gears 142 are rotatably supported on short pins 146. Long pins 74 are shown to extend between second carrier ring 80 and a third carrier ring 148 while short pins 146 are shown to extend between third carrier ring 148 and a fourth carrier ring 149. Second planet gears 140 are meshed with second sun gear 136 while third planet gears 142 are meshed with third sun gear 138. In addition, second and third planet gears 140 and 142 are circumferentially arranged in meshed pairs. According to the particular construction shown, second sun gear 136 acts as a first output of second gearset 50 while third sun gear 138 acts as the second output thereof. Third sun gear 138 is fixed to a drive sprocket 150 that is operable for transferring drive torque to a driven sprocket 152 fixed to front output shaft 30. A power chain 154 is shown to interconnect driven sprocket 152 to drive sprocket 150.

As best seen from FIG. 4, mode clutch assembly 46 is arranged to control speed differentiation and torque biasing between front output shaft 30 and rear output shaft 40. Mode clutch assembly 46 is a multi-plate friction clutch which includes a clutch hub 160 that is fixed to rear output shaft 40, a clutch drum 162 integrally formed with drive sprocket 150, and a clutch pack 164 disposed therebetween. Clutch pack 164 includes a set of inner friction plates splined to clutch hub 160 and which are interleaved with a set of outer friction plates splined to drum 162. Clutch pack 164 is located between a reaction plate 166 formed integrally with clutch hub 160 and an apply plate 168 that is splined to drum 162. As will be detailed, movement of apply plate 168 relative to clutch pack 164 functions to vary the compressive engagement force exerted thereon for adaptively regulating speed differentiation and torque biasing between front output shaft 30 and rear output shaft 40.

Mode clutch assembly 46 further includes a clutch actuation mechanism 170 for moving apply plate 168 under the control of actuation assembly 54. Mechanism 170 includes a locator plate 172 that is splined for rotation with clutch drum 162, a pressure plate 174, and a set of thrust pins 176 having one end fixed to pressure plate 174 and which extend through apertures in locator plate 172. The second end of thrust pins 176 are adapted to engage apply plate 168. A return spring 178 urges pressure plate 174 in a direction away from locator plate 172 for normally retracting thrust pins 176 from engagement with apply plate 168. However, axial movement of pressure plate 174 between a fully-retracted position and a fully-extended position causes thrust pins 176 to exert a clutch engagement force on apply plate 168 that varies between predetermined minimum and maximum values.

To provide means for moving pressure plate 174 between its fully retracted and fully extended positions, clutch actuation mechanism 170 includes a thrust assembly 180, a lever arm 182, and a mode fork 184. Mode fork 184 has a tubular segment 186 fixed to a shift rail 188, the opposite ends of which are supported in sockets formed in housing 66. Thrust assembly 180 includes a thrust ring 194 and a thrust bearing assembly 196 that is disposed between thrust ring 194 and pressure plate 174. In addition, lever arm 182 is mounted to a pivot post 198 for pivotal movement relative to thrust assembly 180. Lever arm 182 includes a first end portion 200 that is journalled on shift rail 188 and which engages one end of mode fork 184. The opposite end portion 202 of lever arm 182 is a C-shaped biforcated section partially surrounding rear output shaft 40 and which engages thrust ring 194. In operation, axial movement of mode fork 184 causes corresponding pivotal movement of lever arm 182 which, in turn, controls movement of thrust assembly 180 and pressure plate 174.

Preferably, actuator assembly 54 includes a rotary actuator, such as an electric gearmotor 206, which is operable for generating an output torque, the value of which varies as a function of the magnitude of the electrical control signal applied thereto by controller 58. To provide means for selectively controlling the magnitude of the clutch engagement force exerted on clutch pack 164 and movement of range fork 124, actuator assembly 54 further includes a drive mechanism 208. Drive mechanism 208 is interconnected to a rotary output member 210 of gearmotor 206 for changing its output torque into an axially-directed forces that are used for controlling axial movement of range fork 124 and mode fork 184. According to a preferred construction, drive mechanism 208 includes a sector plate 212 that is rotatably driven through a range of angular motion by output member 210 of gearmotor 206.

To generate axial movement of mode fork 184, sector plate 212 includes a mode cam surface 214 against which a mode pin 216 is engaged. Mode pin 216 is fixed to a flange section 218 of mode fork 184. The contour of mode slot 214 is configured to cause the desired direction and amount of axial movement of mode fork 184 in response to rotation of sector plate 212 for generating the desired clutch engagement force exerted by actuation mechanism 170 on clutch pack 164. To control axial movement of range sleeve 110, sector plate 212 also has a range slot 220 within which a range pin 222 extends. Range pin 222 is fixed to a tubular segment 224 of range fork 124 which is shown supported for sliding movement on shift rail 188. The contour of range slot 220 is configured to cause controlled axial movement of range sleeve 110 in response to controlled rotation of sector plate 212.

According to a preferred embodiment of the present invention, sector plate 212 may be rotated to any one of five distinct sector positions to establish a corresponding number of drive modes. These modes may include a locked four-wheel high-range drive mode, a full-time four-wheel high-range drive mode, a neutral mode, a full-time four-wheel low-range drive mode, and a locked four-wheel low-range drive mode. The particular four-wheel drive mode selected is established by the position of mode pin 216 against mode cam 214 and the position of range pin 222 in range slot 220. In operation, the vehicle operator selects a desired four-wheel drive mode via actuation of mode select mechanism 60 which, in turn, sends a mode signal to controller 58 that is indicative of the selection. Thereafter, controller 58 generates an electric control signal that is applied to gearmotor 206 for controlling the rotated position of sector plate 212. More particularly, upon selection of the locked four-wheel high-range drive mode, the neutral mode, or the locked four-wheel low-range drive mode, sector plate 212 is controllably rotated to a predefined sector position associated with each mode. However, when either of the full-time four-wheel high-range or low-range drive modes are selected, power transfer system 10 is operable for modulating the clutch engagement force applied to clutch pack 164 of mode clutch assembly 46 as a function of the various sensor input signals.

Mode select mechanism 60 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode select mechanism 60 offers the vehicle operator the option of deliberately choosing between the various operative drive modes.

When the locked full-time four-wheel high-range drive mode is selected, sector plate 212 is rotated to a sector position causing range sleeve 110 to move to its H position and mode fork 184 to move to a position whereat pressure plate 174 is in its fully extended position. As such, the maximum clutch engagement force is exerted on clutch pack 164 and mode clutch assembly 46 is considered to be operating in a fully actuated (locked-up) condition. Thus, speed differentiation between rear output shaft 40 and front output shaft 30 is prevented. Power transfer system 10 may also include a brake which is an electrically controlled device. The brake is engaged once sector plate 212 is rotated to its sector position corresponding to the locked full-time four-wheel high-mode for locking sector plate 212 against further rotation.

If mode select mechanism 60 thereafter signals selection of the full-time four-wheel high-range drive mode, gearmotor 206 is actuated for initially rotating sector plate 212 to a position causing mode fork 184 to move to a position whereat pressure plate 174 is in its fully retracted position while range sleeve 110 is maintained in its H position. As such, the minimum clutch engagement force is exerted on clutch pack 164 such that mode clutch assembly 46 is considered to be in a non-actuated condition, thereby permitting unrestricted speed differentiation between the output shafts. However, in the full-time four-wheel high-range drive mode, mode clutch assembly 46 provides adaptive control of speed differentiation and torque biasing. Specifically, the actuated state of gearmotor 206 is continuously monitored and modulated in accordance with specific predefined relationships based on the current value of the sensor input signals. As is apparent, the magnitude of the clutch engagement force is varied by bi-directional rotation of sector plate 212 between its full-time and locked high-range sector positions.

Power transfer system 10 also permits transfer case 20 to be shifted into the neutral mode upon mode selection mechanism 60 signaling selection thereof. Controller 58 commands gearmotor 206 to rotate sector plate to a neutral sector position. In this sector position, the contour of first range slot 220 has caused range sleeve 110 to move to its N position. Likewise, mode cam 214 has caused mode fork 184 to move to a position whereat mode clutch assembly 46 is non-actuated.

If a full-time four-wheel low-range drive mode is made available, its selection would cause gearmotor 206 to rotate sector plate 212 to a corresponding sector position whereat range sleeve 110 is in its L position and mode clutch assembly 46 is non-actuated. Again, the contour of the range slot and the mode cam control the coordinated movement of range fork 124 and mode fork 184 to establish the desired mode. Preferably, automatic clutch control in the full-time low-range drive mode is similar to that described the full-time four-wheel high-range drive mode. To accomplish this adaptive clutch control, sector plate 212 must be moveable from its full-time low-range sector position to a locked four-wheel low-range drive mode sector position where a maximum engagement force is applied to clutch pack 164. As before, such rotation of sector plate 212 occurs while range sleeve 110 is maintained in its L position. Automatic control of mode clutch assembly 46 is then accomplished in the full-time four-wheel low-range drive mode to bias torque and limit slip automatically. Finally, selection of the locked four-wheel low-range drive mode signals controller 58 to rotate sector plate 212 to its corresponding sector position. In this sector position, range sleeve 110 is in its L position and mode fork 184 is in the position where pressure plate 174 is in its fully extended position such that mode clutch assembly 46 is locked-up. As before, the brake can be applied to hold sector plate 212 in this position so as to allow gearmotor 206 to be turned-off, thereby decreasing its on-time service.

First planetary gearset 48 is arranged to provide a ratio of between 2:1 to 5:1 for its low-range. For example, first planetary gearset 48 establishes a ratio of about 2.6:1 when first sun gear 70 has 55 teeth, ring gear 68 has 89 teeth, and first planet gears 72 each have 17 teeth. Alternately, first planetary gearset 48 can have a first sun gear 70 with 31 teeth while ring gear 68 has 89 teeth and first planet gears 72 each have 29 teeth for defining a 3.9:1 low-range ratio.

Figure 5:
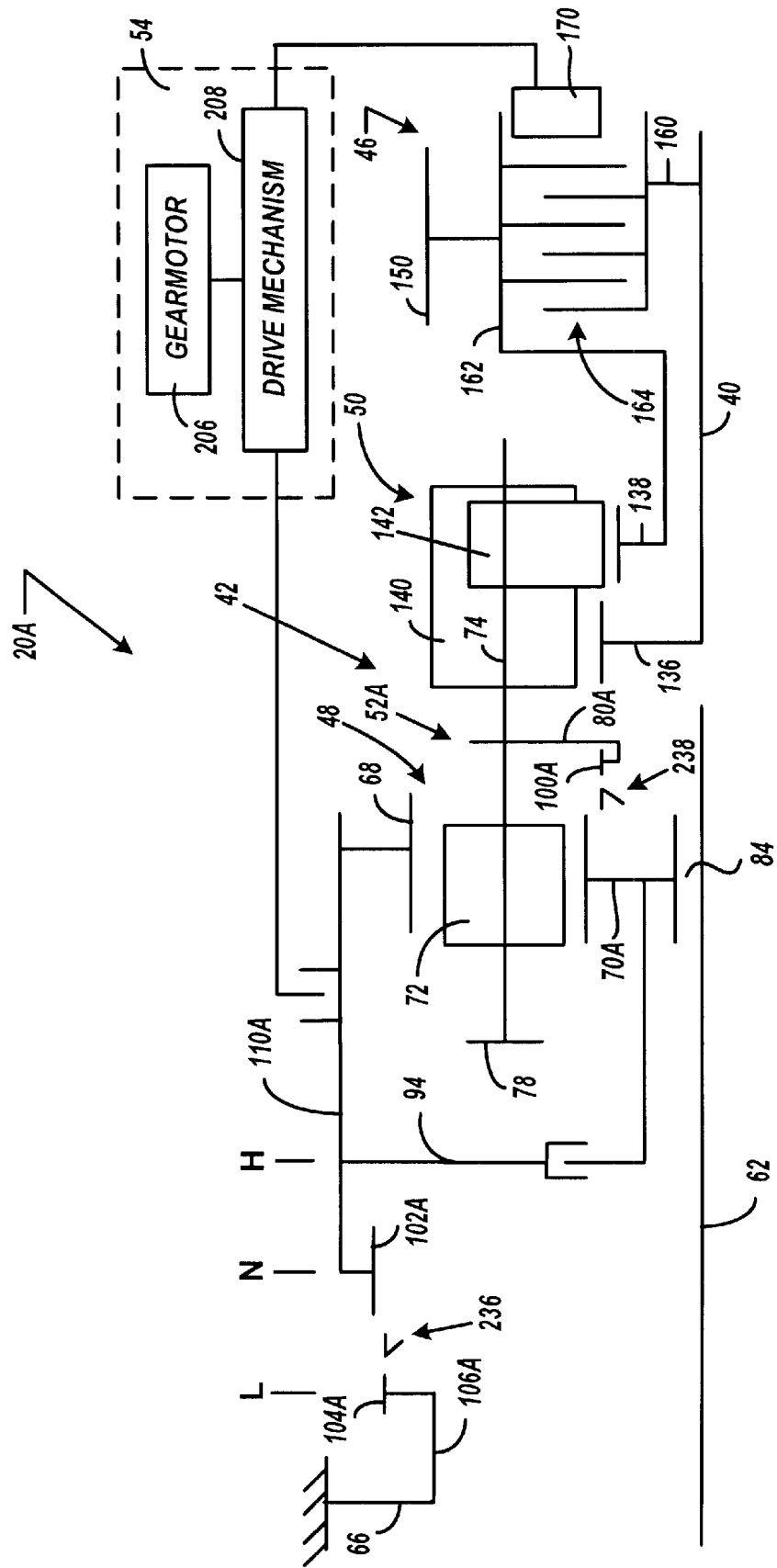
FIG. 5 is a schematic view of a full-time two-speed transfer case constructed according to an alternative preferred embodiment of the present invention.

Referring now to FIG. 5, a transfer case 20A is schematically shown to be a modified version of transfer case 20 such that common reference numerals are again used to identify similar components. Basically, transfer case 20A has a "synchronized" range shift mechanism 44 that incorporates a pair of synchronizer assemblies 236 and 238 to provide synchronized high-range and low-range shifts. Specifically, synchronizer assembly 236 is disposed between brake plate 106A and range sleeve 110A for synchronizing the speed of ring gear 68 relative to housing 66 before clutch teeth 102A on range sleeve 110 engage clutch teeth 104A on brake plate 106A. This arrangement allows on-the-move shifting from the high-range drive modes into the low-range drive modes. In addition, second synchronizer assembly 238 is disposed between first sun gear 70A and second carrier ring 80A for synchronizing the speed of carrier assembly 52A relative to first sun gear 70A before clutch teeth 98A on first sun gear 70A can engage clutch teeth 100A on carrier ring 80A. This arrangement allows on-the-move shifting from the low-range drive modes into the high-range drive modes.

The foregoing discussion discloses and describes the preferred embodiments for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case comprising:
   an input shaft;
   first and second output shafts;
   a planetary gear assembly interconnecting said input shaft to said first and second output shafts and including first and second gearsets having a common carrier assembly, said first gearset including a first sun gear splined to said input shaft, a ring gear, and a first planet gear supported by said carrier assembly and meshed with said first sun gear and said ring gear, said second gearset including a second sun gear connected to said first output shaft, a third sun gear operably connected to said second output shaft, a second planet gear supported by said carrier assembly and meshed with said second sun gear, and a third planet gear supported by said carrier assembly and meshed with said third sun gear and said second planet gear;
   a coupling ring interconnecting said ring gear to said first sun gear to facilitate relative rotation therebetween and axial movement of said first sun gear on said input shaft in response to axial movement of said ring gear;
   a range clutch including a first clutch plate fixed to said carrier assembly, a second clutch plate fixed to a stationary member, and a range sleeve fixed to said ring gear and axially moveable between a high-range position and a low-range position to establish corresponding high-range and low-range drive connections between said input shaft and said carrier assembly, said range sleeve is operable in its high-range position to couple said first sun gear to said first clutch plate and release said ring gear from coupled engagement with said second clutch plate, and said range sleeve is operable in its low-range position to release said first sun gear from couple engagement with said first clutch plate and couple said ring gear to said second clutch plate; and
   a shift mechanism for moving said range sleeve between its high-range and low-range positions.

2. The transfer case of claim 1 wherein said range clutch further includes a synchronizer operably disposed between said second clutch plate and said ring gear for inhibiting movement of said range sleeve to its low-range position until speed synchronization is established therebetween.

3. The transfer case of claim 1 further comprising a quill shaft formed on said input shaft to which said first sun gear is splined, said first sun gear is adapted to slide axially relative to said quill shaft between its first and second positions while being continuously driven by said input shaft.

4. The transfer case of claim 1 wherein said ring gear includes a plate segment, and wherein said coupling ring is fixed to said plate segment of said ring gear and has a circumferential groove within which a radial lug segment of said first sun gear is retained.

5. The transfer case of claim 1 wherein said shift mechanism includes a range fork operable for moving said range sleeve between its high-range and low-range positions, and an actuator assembly for moving said first range fork.

6. The transfer case of claim 5 wherein said actuator assembly includes a sector plate and a power-operated actuator for rotating said sector plate, and wherein said range fork engages said sector plate such that rotation of said sector plate causes movement of said range fork.

7. The transfer case of claim 1 further including a mode clutch operably disposed between said first and second output shafts and which is normally operable to permit speed differentiation between said output shafts, said mode clutch is further operable for limiting excessive speed differentiation between said output shafts.

8. The transfer case of claim 7 wherein said mode clutch is a multi-plate clutch assembly having a set of first clutch plates fixed for rotation with said first output shaft and which are interleaved with a set of second clutch plates fixed for rotation with said second output shaft, and means for transferring drive torque from the faster rotating clutch plates to the slower rotating clutch plates in response to said speed differential exceeding a predefined value.

9. The transfer case of claim 8 wherein said mode clutch includes a thrust mechanism for exerting a clutch engagement force on said interleaved clutch plates, and an actuator assembly for generating said clutch engagement force.

10. The transfer case of claim 1 wherein said range clutch further comprises a first synchronizer assembly disposed between said first clutch plate and said first sun gear, and a second synchronizer assembly disposed between said second clutch plate and said range sleeve.

11. The transfer case of claim 10 wherein said first sun gear has clutch teeth adapted to engage clutch teeth formed on a carrier ring associated with said carrier assembly with said first synchronizer assembly operably disposed between said first sun gear and said carrier ring.

12. A transfer case comprising:
    an input shaft;
    first and second output shafts;
    a planetary gear assembly interconnecting said input shaft to said first and second output shafts and including first and second gearsets having a common carrier assembly, said first gearset including a first sun gear driving by said input shaft, a ring gear, and a first planet gear supported by said carrier assembly and meshed with said first sun gear and said ring gear, said second gearset including a second sun gear connected to said first output shaft, a third sun gear operably connected to said second output shaft, a second planet gear supported by said carrier assembly and meshed with said second sun gear, and a third planet gear supported by said carrier assembly and meshed with said third sun gear and said second planet gear, said ring gear is interconnected to said first sun gear to permit concurrent movement thereof between a first position and a second position while allowing relative rotation therebetween, said first sun gear is permitted to rotate relative to said carrier assembly when located in its second position and said first sun gear is coupled to said carrier assembly when located in its first position;
    a first clutch plate driven by said carrier assembly;
    a second clutch plate fixed to a stationary member; and
    a shift mechanism for moving said ring gear between its first and second positions to establish high-range and low-range drive connections between said input shaft and said carrier assembly, said high-range connection is established when said ring gear is in its first position whereat said first sun gear is coupled to said first clutch plate and said ring gear is released from said second clutch plate and said low-range drive connection is established when said ring gear is in its second position whereat said ring gear is coupled to said second clutch plate and said first sun gear is released from said first clutch plate.

13. The transfer case of claim 12 further includes a first synchronizer operably disposed between said first clutch plate and said first sun gear for inhibiting movement of said ring gear to its first position until speed synchronization is established, and a second synchronizer operably disposed between said second clutch plate and said ring gear for inhibiting movement of said ring gear to its second position until speed synchronization is established therebetween.

14. The transfer case of claim 12 further comprising a quill shaft formed on said input shaft to which said first sun gear is splined, said first sun gear is adapted to slide axially relative to said quill shaft between its first and second positions while being continuously driven by said input shaft.

15. The transfer case of claim 12 wherein a coupling ring fixed to said ring gear causes sliding movement of said first sun gear in response to concurrent movement of said ring gear.

16. The transfer case of claim 15 wherein said ring gear includes a plate segment, and wherein said coupling ring is fixed to said plate segment of said ring gear and has a circumferential groove within which a radial lug segment of said first sun gear is retained.

17. The transfer case of claim 12 wherein said shift mechanism includes a range fork operable for moving said range sleeve between its high-range and low-range positions, and an actuator assembly for moving said range fork.

18. The transfer case of claim 17 wherein said actuator assembly includes a sector plate and a power-operated actuator for rotating said sector plate, and wherein said range fork engages said sector plate such that rotation of said sector plate causes movement of said range fork.

19. The transfer case of claim 12 further including a mode clutch operably disposed between said first and second output shafts and which is normally operable to permit speed differentiation between said output shafts, said mode clutch is further operable for limiting excessive speed differentiation between said output shafts.

20. The transfer case of claim 19 wherein said mode clutch is a multi-plate clutch assembly having a set of first clutch plates fixed for rotation with said first output shaft and which are interleaved with a set of second clutch plates fixed for rotation with said second output shaft, and means for transferring drive torque from the faster rotating clutch plates to the slower rotating clutch plates in response to said sped differential exceeding a predefined value.

* * * * *